(12) United States Patent
Costantini et al.

(10) Patent No.: US 8,482,453 B2
(45) Date of Patent: Jul. 9, 2013

(54) IDENTIFICATION AND ANALYSIS OF PERSISTENT SCATTERERS IN SERIES OF SAR IMAGES

(75) Inventors: Mario Costantini, Rome (IT); Salvatore Falco, Rome (IT); Fabio Malvarosa, Rome (IT); Federico Minati, Rome (IT)

(73) Assignee: Telespazio S.p.A., Rome (IT)

( * ) Notice: Subject to any disclaimer, the term of this patent is extended or adjusted under 35 U.S.C. 154(b) by 245 days.

(21) Appl. No.: 12/983,108

(22) Filed: Dec. 31, 2010

(65) Prior Publication Data

US 2011/0163911 A1 Jul. 7, 2011
US 2012/0188119 A9 Jul. 26, 2012

Related U.S. Application Data

(63) Continuation of application No. PCT/EP2009/058522, filed on Jul. 6, 2009.

(30) Foreign Application Priority Data

Jul. 4, 2008 (EP) .................................... 08159769

(51) Int. Cl.
 *G01S 13/00* (2006.01)
(52) U.S. Cl.
 USPC ....................................................... 342/25 R
(58) Field of Classification Search
 USPC ........................................................ 342/25 R
 See application file for complete search history.

(56) References Cited

U.S. PATENT DOCUMENTS

| 6,208,283 B1 * | 3/2001 | Murata et al. ............... 342/25 R |
| 6,583,751 B1 | 6/2003 | Ferretti et al. |
| 2005/0057391 A1 * | 3/2005 | Forsley et al. .............. 342/25 A |

OTHER PUBLICATIONS

Bamler, R. et al., Topical Review: Synthetic Aperture Radar Interferometry, Inverse Problems, vol. 14, p. R1-R54, 1998.
Costantini, M., A Novel Phase Unwrapping Method Based on Network Programming, IEEE Trans. Geosci. Remote sing, vol. 36, p. 813-821, 1998.
Costantini, et al. A Generalized Phase Unwrapping Approach for Sparse Data, Proc. Int. Geosci. Remote Sensing Symp. (IGARSS), Hamburg, Germany, pp. 267-269, Jun. 28-Jul. 2, 1999.
Rosen, P. A. et al., Synthetic Aperture Radar Interferometry, Proceedings of the IEEE, vol. 88, No. 3, p. 333-382, 2000.
Ferretti, A. et al., Non-linear Subsidence Rate Estimation Using Permanent Scatterers in Differential SAR Interferometry, IEEE Trans. Geosci. Remote Sensing, vol. 38, p. 2202-2212, 2000.
Ferretti, A. et al., Permanent Scatterers in SAR Interferometry, IEEE Trans. Geosci. Remote Sensing, vol. 29, No. 1, p. 8-20, 2001.
Costantini, M. et al., A Curvature Based Method for Combining Multi-Temporal SAR Differential Interferometric Measurements, Proc. of Fringe 2003 Workshop, Frascati, Italy, Dec. 2003.
Kampes, et al., Velocity Field Retrieval from Long Term Coherent Points in Radar Interferometric Stacks, XP-002543787, 2003 IEEE.

(Continued)

*Primary Examiner* — Timothy A Brainard
(74) *Attorney, Agent, or Firm* — McCarter & English, LLP

(57) ABSTRACT

Disclosed herein is a method for identifying persistent scatterers in digital "Synthetic Aperture Radar" images of an area of Earth's surface each taken at a respective time. The method involves processing the digital Synthetic Aperture Radar images to produce digital generalized differential interferograms. The method further involves analyzing properties of pairs of pixels in the digital generalized differential interferograms to identify individual pixels imaging persistent scatterers.

19 Claims, 1 Drawing Sheet

OTHER PUBLICATIONS

Hooper et al., A New Method for Measuring Deformation on Volcanoes and Other Natural terrains Using InSAR Persistent Scatterers, Geophysical Research Letters, vol. 31, L23611, Dec. 10, 2004, XP007909615.

Ketelaar, et al., Initial Point Selection and Validation in PS-InSAR Using Integrated Amplitude Calibration, Geoscience and Remote Sensing Symposium, vol. 8, pp. 5490-5493, XP010848854, 2005.

Kampes, The Stun Algorithm (Chapter 4)—Radar Interferometry—Persistent Scatterer Technique, XP002543786, pp. 43-69, 2006.

Costantini, et al., A Generalized Space-Time Formulation for Robust Persistent Scatterer Interferometry, Geoscience and Remote Sensing Symposium, pp. 1240-1243, XP031179198, 2006.

PCT International Search Report and Written Opinion dated Sep. 17, 2009.

* cited by examiner

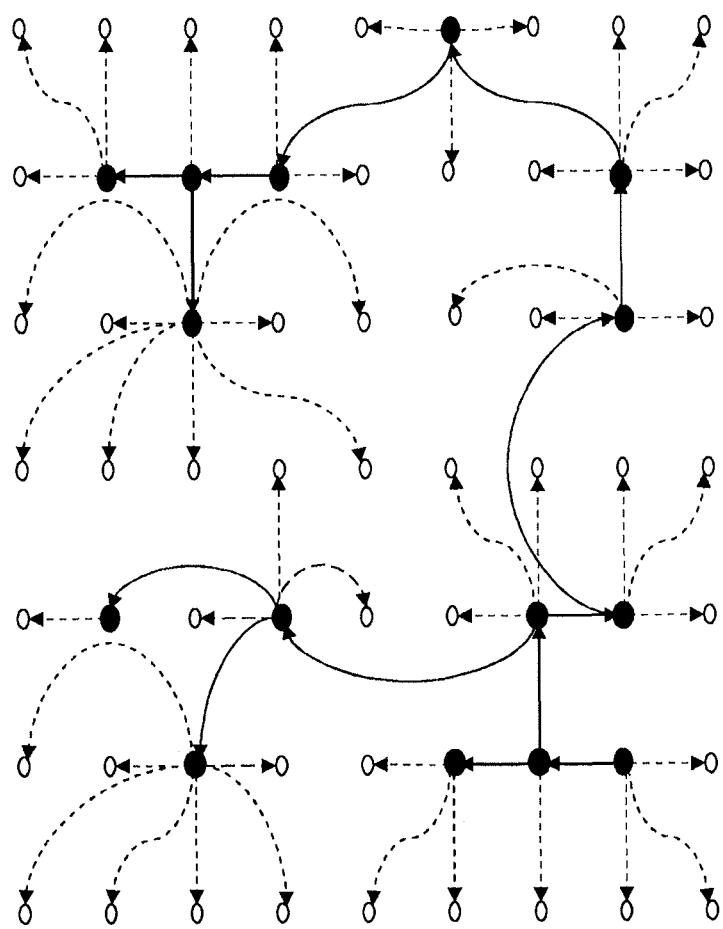

IDENTIFICATION AND ANALYSIS OF PERSISTENT SCATTERERS IN SERIES OF SAR IMAGES

CROSS-REFERENCE TO RELATED APPLICATIONS

This application is a continuation application that claims priority benefit to International Application PCT/EP2009/058522 filed Jul. 6, 2009. The foregoing International Application claimed priority benefit to European Patent Application No. 08159769.2.

TECHNICAL FIELD OF THE INVENTION

The present invention relates to a new method for identification and analysis of Persistent Scatterers (PS) in series of digital Synthetic Aperture Radar (SAR) images.

In particular, in the followings, for the sake of description simplicity and without losing generality, the present invention will be described with specific reference to SAR images acquired from spaceborne SAR systems, remaining clear that the present invention may also be applied to SAR images acquired from airborne or ground-based SAR systems.

BACKGROUND ART

As is known, repeat-pass satellite Synthetic Aperture Radar (SAR) interferometry is a very effective technology for measuring terrain displacements due to subsidence, landslides, earthquakes and volcanic phenomena, as reviewed in P. A. Rosen, S. Hensley, I. R. Joughin, F. K. Li, S. N. Madsen, E. Rodriguez, R. M. Goldstein, *Synthetic Aperture Radar interferometry*, Proceedings of the IEEE, vol. 88, no. 3, pp. 333-382, March 2000, and in R. Bamler, P. Hartl, *Topical Review: Synthetic Aperture Radar interferometry*, Inverse Problems, vol. 14, pp. R1-R54, 1998.

In particular, the repeat-pass satellite SAR interferometry is based on a coherent sensing of the Earth's surface through satellite-mounted (or aeroplane-mounted or ground-based) radars which image the Earth's surface with a spatial resolution of the order of one meter or few meters with current spaceborne sensors (less for airborne or ground-based radars). A combination of backscattering signals from all sources within each resolution cell results in an amplitude and a phase associated with the resolution cell or pixel in the SAR image.

In detail, the phase of a single pixel in a SAR image, which is associated with the portion of terrain within the resolution cell, can be modeled as the sum of four contributions:

a first contribution $\phi_s$ is a phase associated with the scattering mechanism in the given resolution cell;

a second contribution $\phi_r$ is related to the distance r between the sensor and the resolution cell, and to the wavelength $\lambda$ of the sensor, the second contribution $\phi_r$ being defined as $\phi_r = 4\pi r/\lambda$;

a third contribution $\phi_a$ is a phase associated with the delay introduced by the atmosphere; and a fourth contribution $\phi_n$ is a residual from the model, including phase noise.

Taking into account, in first instance, only the scattering-related phase contribution $\phi_s$ and the sensor-resolution cell distance phase contribution $\phi_r$, if two SAR images are acquired at different times and with slightly different look angles, and under the hypothesis that the scattering behaviour of the resolution cell is identical in the two acquisitions, the phase difference of the two co-registered images, the so-called "interferometric phase", depends on the elevation of the resolution cell and on its displacements, since the term $\phi_s$ due to the scatterer is removed in the difference. A Digital Elevation Model (DEM) can be used to determine and remove the contribution of the terrain elevation from the interferometric phase and, therefore, to obtain terrain displacements.

In principle, differential interferometry can measure terrain displacements of few millimeters. However, the accuracy and the feasibility of the measurements are influenced by different error sources, that can be divided in two groups: noise, mainly due to decorrelation between the SAR images at different acquisitions, and systematic errors, due to limited accuracies of the orbital data and of the DEM used in the processing, and to different atmospheric conditions at the different acquisition dates.

In particular, decorrelation noise makes valid interferometric measurements possible only on a sparse set of points, called Persistent Scatterers (PS), which remain correlated at different acquisitions. PS typically correspond to resolution cells in which the dominant contribution to the signal comes from a single, point-like and stable during the time of the acquisitions, scattering mechanism. These scattering mechanisms are more frequent in the presence of buildings, infrastructures, rocks and bare soil.

Identification of the PS and then retrieval of their movement (together with their precise elevation) from a series of SAR acquisitions are key problems of Persistent Scatterer Interferometry (PSI).

A known method, named Permanent Scatterers method and disclosed in A. Ferretti, C. Prati, and F. Rocca, *Permanent scatterers in SAR interferometry*, IEEE Trans. Geosci. Remote Sensing, vol. 39, no. 1, pp. 8-20, January 2001, and in A. Ferretti, C. Prati, and F. Rocca, *Non-linear subsidence rate estimation using permanent scatterers in differential SAR interferometry*, IEEE Trans. Geosci. Remote Sensing, vol. 38, pp. 2202-2212, September 2000, with the idea of minimizing amplitude and phase dispersions in long series of full resolution SAR images, has introduced a new way of conceiving SAR interferometry.

In particular, the Permanent Scatterers method requires an identification of a preliminary set of PS, selected according to the stability in the different acquisitions of their signal amplitude (i.e., the modulus of the reflectivity). These points are analysed in relation with a phase model to determine the PS displacement velocity (assumed constant, the displacement evolves linearly with time) and elevation (or, more precisely, elevation correction with respect to the DEM used to flatten the phase), and to refine the PS selection.

These velocity and elevation contributions are then subtracted to the PS phase to determine the phase residuals, which contain atmospheric contribution, non-linear-with-time displacement, and the other non-modeled contributions including noise.

Atmospheric phase contribution can be then filtered out by exploiting its property of being spatially correlated (and temporally uncorrelated).

The atmospheric phase contributions calculated on the selected PS can then be used to estimate the atmospheric phase contributions in all points, by local or global (model-based) interpolations or fits.

These estimations can be subtracted from the relative images, which can be processed again to find better elevation and displacement velocity and new PS.

This procedure can be iterated several times to increase the number of PS found.

In this approach, it is fundamental to calibrate the data, both radiometrically and from the point of view of phase. In particular, radiometric calibration is necessary to analyze the signal amplitude dispersion, whereas calibrating the phase means removing orbital and atmospheric phase contributions, a step necessary not only for the analysis but also for the identification of all possible PS.

OBJECT AND SUMMARY OF THE INVENTION

A major drawback of the aforementioned approach is that final results are sensitive to density and connectiveness of measurements obtained in first processing steps, and to processing errors occurring in these first processing steps, processing errors being more probable particularly in large areas where isolated or weak Persistent Scatterers are present.

Moreover, it may happen that no preliminary measurements are obtained in large areas where isolated or weak Persistent Scatterers are present.

Furthermore, the aforementioned approach requires models for atmospheric artifacts and deformation history, or successive refinements.

The objective of present invention is then to provide a persistent scatterer identification method which can overcome, at least in part, the above cited drawbacks.

This objective is achieved by the present invention in that it relates to a method for identifying persistent scatterers, as defined in the appended claims.

In particular, the present invention relates to a method for identifying persistent scatterers in digital Synthetic Aperture Radar (SAR) images of an area of Earth's surface each taken at a respective time. The method comprises processing the digital Synthetic Aperture Radar (SAR) images to produce digital generalized differential interferograms.

The method is characterized by further comprising analyzing properties of pairs of pixels in the digital generalized differential interferograms to identify individual pixels imaging persistent scatterers.

Preferably, analyzing properties of pairs of pixels in the digital generalized differential interferograms comprises analyzing properties of the same pairs of pixels in the digital generalized differential interferograms.

BRIEF DESCRIPTION OF THE DRAWING

For a better understanding of the present invention, preferred embodiments, which are intended purely by way of example and are not to be construed as limiting, will now be described with reference to the attached drawings (all not to scale), wherein:

FIG. 1 shows schematically points identified as Persistent Scatterers (PS) or non-PS according to the present invention.

DETAILED DESCRIPTION OF PREFERRED EMBODIMENTS OF THE INVENTION

The following discussion is presented to enable a person skilled in the art to make and use the invention. Various modifications to the embodiments will be readily apparent to those skilled in the art, without departing from the scope of the present invention as claimed.

Thus, the present invention is not intended to be limited to the embodiments shown, but is to be accorded the widest scope consistent with the principles and features disclosed herein and defined in the appended claims.

Moreover, the present invention is implemented by means of a software program product, loadable in a memory of an electronic processor, and comprising software code portions for implementing, when the software program product is run on the electronic processor, the Persistent Scatterer identification method described hereinafter.

In the followings, for the sake of description simplicity and without losing generality, the terms "point(s)" and "pixel(s)" will be used as essentially interchangeable terms, and the expression "Persistent Scatterer(s)" (or PS) will be used both for a persistent scatterer imaged by a pixel (or persistent scatterers imaged by pixels) and for a pixel imaging a persistent scatterer (or pixels imaging persistent scatterers).

In particular, when the expression "Persistent Scatterer(s)" (or PS) will be used in the followings, the correct meaning, between the two aforesaid meanings, associated therewith will be doubtless understandable on the basis of the respective context in which this expression will be used.

In general, the method, according to the present invention, for identifying and analyzing Persistent Scatterers, that the Applicant has named Persistent Scatterer Pairs (PSP) method, exploits only relative properties of pairs of points and a quite general model of the SAR signal, allowing to better identify all Persistent Scatterers (PS) (also in areas were they are not very dense or characterized by movements non-linear with the time), and to retrieve their movements and precise elevations (and consequently also a better localization).

In particular, the PSP method does require neither a model for atmospheric artifacts, nor a pre-calibration of SAR images, and it is robust with respect to density of PS found in preliminary stages.

The central idea of the PSP method is both to identify and analyze PS working only with pairs of points ("arcs").

Since spatially correlated disturbances affect in a similar way signals in two nearby points, working with phase differences between close points removes atmosphere and orbit phase contributions, thus removing the need for data pre-calibration.

In detail, according to the PSP method, a series of N co-registered SAR acquisitions, i.e., N co-registered digital SAR images, with N>1, are processed to produce generalized differential interferograms with respect to a master, or reference, image.

In particular, according to the present invention, a generalized differential interferogram is defined as a differential interferogram between the master (or reference) image and a co-registered SAR image, where the master image can be a (real) image selected among the N co-registered SAR images or a synthetic reference image. When the master image is a real image, the definition either corresponds to that one of the classical differential interferograms or can include also the possibility of an "identically-zero-phase interferogram" of the master image with itself.

In the followings, for the sake of description simplicity and without losing generality, the expressions "generalized differential interferogram(s)", "differential interferogram(s)" and "interferogram(s)" will be used as essentially interchangeable expressions.

Each interferogram has an associated perpendicular (spatial) baseline $B_i$ (i.e., the component perpendicular to the line of sight) and time difference (or temporal baseline) $T_i$ with respect to the master image, wherein i denotes an index identifying a i-th considered interferogram.

Then, let $\delta\phi_{a,i}$ be a phase difference between two points, i.e., pixels, in the i-th considered interferogram which are identified by an arc a connecting them. The arc a is associated with an elevation difference $\delta h_a$ (a residual elevation difference if a DEM is used to flatten the phase) and with a velocity difference $\delta v_a$ (velocity means velocity along the line of sight) between the two points, and $\delta\phi_{a,i}$ can be modeled as:

$$\delta\phi_{a,i} = \left[\frac{4\pi}{\lambda}(T_i\delta v_a + \alpha B_i \delta h_a) + \varepsilon_{a,i}\right]_{2\pi}, \quad (1)$$

where $\lambda$ is the wavelength at which the N SAR images have been sensed (or taken), $\alpha$ is a known parameter, and $\epsilon_{a,i}$ is a deviation from the model and includes mainly thermal and speckle noise when the length of the arc a is limited. The noise $\epsilon_{a,i}$ is, by definition, small for Persistent Scatterers Pairs (PSPs), and then equation (1) is a very useful equation for selecting PSPs and retrieving the residual elevation and velocity differences $\delta h_a$ and $\delta v_a$ associated with the arc a.

A useful parameter is a temporal or multi-acquisition coherence $\gamma_a$ associated with the arc a and defined as:

$$\gamma_a = \max_{\delta v_a, \delta h_a} \left|\sum_i w_{a,i} e^{j\varepsilon_{a,i}}\right| \quad (2)$$

$$= \max_{\delta v_a, \delta h_a} \left|\sum_i w_{a,i} e^{j\left[\delta\phi_{a,i} - \frac{4\pi}{\lambda}(T_i\delta v_a + \alpha B_i \delta h_a)\right]}\right|,$$

where $w_{a,i}$ are possible weights chosen according to a given criterion (they can be all unitary in the simplest case, or depend for example on the amplitude values of the acquired SAR images, or can be chosen according to other criteria).

In some cases, some of the parameters $\delta h_a$ and $\delta v_a$ can be considered known and therefore kept fixed in the maximization in the equation (2).

Usually in the literature, the sum in the multi-acquisition coherence $\gamma_a$ defined by the equation (2) extends over the N−1 interferograms formed by the master image with all other images.

On the contrary, the Applicant has noted that also the identically-zero-phase interferogram of the master image with itself can be considered in the sum in the definition (2) or, which is equivalent given the definition (2), the N generalized differential interferograms with respect to an external synthetic zero-phase master image can be considered in the sum in the definition (2). It can be seen that the results obtained by applying the proposed modification are more correct theoretically, while, from the quantitative point of view, the differences can be significant in particular when the number N of available acquisitions is not very large.

The proposed modification to the definition (2) of the multi-acquisition coherence $\gamma_a$ can be applied also to the analogous definitions of multi-acquisition or temporal coherence, based on points or arcs, that are used in other Persistent Scatterer (PS) methods, as, for example, those originally proposed in the aforementioned A. Ferretti, C. Prati, and F. Rocca, *Permanent scatterers in SAR interferometry*, and in A. Ferretti, C. Prati, and F. Rocca, *Non-linear subsidence rate estimation using permanent scatterers in differential SAR interferometry*, or those successively developed by other people.

The multi-acquisition coherence $\gamma_a$ defined by (2) can be used to measure the quality of the arc a as a PSP by means of an arc test.

In particular, the arc a passes the arc test if $\gamma_a$ is greater than a given threshold. The threshold to be used can be determined empirically, or based on simulations or analytical derivations. However, the algorithm is independent of the type of arc test used, and different or more complex arc tests, also including the analysis of more arcs, can be used.

Working with arcs could require much more computations than analyzing single points. In fact, with a set of P points, there are (P−1)P/2 arcs to analyze.

In the case of interest, only short arcs are meaningful: even considering only the M nearest neighbors of each point of the image, no less than PM/2 arcs should be tested, which can still be a huge number, since PS can be very sparse and, therefore, it is useful that M is a large number.

However, it is not necessary to analyze all possible arcs. A minimal set of arcs useful to identify the searched points, i.e. all PS, is represented by the graph formed by the arcs connecting each PS with a few (at least one) of the closest PS, and by the arcs connecting each point to be discarded with a few (at least one) of the closest PS.

In general, the graph can be partially disconnected if there are different clusters of PS that cannot be connected together, for example because too far apart. Building this graph is not immediate (because the PS positions are not known but are rather the purpose of the search).

This minimal set is built iteratively. In particular, PSP analysis starts with an initial graph $P_0$ of "seed" points (or nodes) and arcs. Following the philosophy of working only on arcs, also the seed points and arcs can be found by applying the arc test to a limited set of arcs connecting nearby points.

This initial set of arcs can consist of the arcs connecting only the first neighboring pixels. However, this choice would be effective only in areas where PS are dense. Therefore, further arcs can be considered that join pixel at relatively larger distances. In order to limit their number, these arcs should be not too long (as explained in the discussion of the equation (1)), and join only the most "promising" points, or PS candidates.

PS candidates can be identified based on a quality index obtained by calculating the multi-acquisition coherence $\gamma_a$ defined by (2) for all the arcs between first neighboring pixels (for example, the quality index of a point can be defined as the maximum among the multi-acquisition coherences $\gamma_a$ on the arcs incident to that point). However, other properties of the pixels, also based on their amplitudes, could be considered to decide the most promising or candidate points.

Moreover, different sets of PS candidates can be identified by applying different thresholds to the quality index. With higher thresholds, the selected points are sparser but more reliable, and with fewer and longer arcs between neighboring pixels it is possible to connect more distant areas. Then, the searched initial limited set of arcs connecting nearby points can be obtained as the union of all the arcs between pixels that are neighboring (not necessarily first neighbors) in the different sets of points corresponding to different thresholds.

Once determined the initial set of arcs, the arc test can be applied to these arcs, and those that pass the arc test will form several distinct graphs not connected together. The graphs that present desired properties, e.g a given cardinality, i.e., the number of nodes of the connected graph, or connectivity, i.e., the minimum number of arcs/nodes whose removal would render the graph disconnected, will form the initial set $P_0$.

However, different properties and different strategies could be considered to select the initial graph $P_0$. Moreover, seeds selection is not a very critical issue, because the iterative algorithm is built in such a way that the results are rather insensitive to the density of the initial seeds. Attention should be posed, however, in order that $P_0$ contains mainly only "good" points, i.e. PS (even though the presence of few "bad" points, which can be in case discarded in the subsequent steps, is not critical), and that the seeds are well distributed, which could be relevant when there are different clusters of PS that cannot be connected together because too far apart.

At the k-th step, with k>0, $P_k$ is obtained by adding to $P_{k-1}$ at least one more PS. To this purpose, the arcs between PS belonging to $P_{k-1}$ and points not yet included in this graph are checked, typically in order of length, and included in $P_k$ depending on the results of the arc tests. In the same way, a point can be identified as not belonging to the PS set and not tested anymore.

For example, the selection can be done based on the number of arcs passing the arc test between a new node and the graph $P_{k-1}$. On the contrary, if a given number of arcs between a node not in $P_{k-1}$ and points already in $P_{k-1}$ are found that do not pass the arc test, this node is not tested anymore (unless arcs shorter than those already considered are found at successive iterations between the node and some successively selected nodes).

However, different arc tests and combinations of arc tests can be used for inclusion or exclusion of a point from the set of PS.

The iterations end at the step L, when all the points have been tested and identified as either PS or non-PS.

The iterative selection of PS described before can be applied both to the whole set of points or to a preselected set of points (PS candidates, as defined above) in order to reduce the computational load.

In relation to the aforedescribed iterative selection of PS, FIG. 1 shows schematically a minimal set of arcs that identifies PS and non-PS points.

In particular, in the FIG. 1 black circles represent Persistent Scatterers (PS) identified according to the PSP method, while blank circles represent points identified as non-PS. Solid arrows represent arcs that passed a chosen arc test, while dashed arrows represent arcs that did not pass the chosen arc test.

In the example shown in FIG. 1, the chosen arc test requires that one arc has a multi-acquisition coherence $\gamma_a$ higher than a given threshold. This means that each point is tested once through the examination of the multi-acquisition coherence $\gamma_a$ of an arc between the tested point and a PS. In particular, if $\gamma_a$ is higher than the given threshold, the tested point is included in the PS set, otherwise it is rejected and not tested again (unless an arc shorter than that one already considered is found at successive iterations between the tested point and some successively selected nodes). However, more complex arc tests are typically used, for example requiring that more than one arc between the tested point and a PS are analyzed.

Moreover, the multi-acquisition coherence $\gamma_a$ defined in (2) provides also an estimate of the residual elevation and velocity differences $\delta h_a$ and $\delta v_a$ associated to the arc a. Therefore, after PS selection, the velocity and residual elevation values on all selected PS can be reconstructed by "integration", up to additive constants, from the differences $\delta h_a$ and $\delta v_a$ calculated on a set of arcs connecting the PS.

However, the difference values $\delta h_a$ and $\delta v_a$ associated with arcs are such that the values reconstructed in the points depend, in general, on the "integration" path. In other words, the solution is over-determined (even though defined up to an additive constant), and can be determined by solving an optimization problem in order to minimize, according to a given metric and weights depending on the arc reliabilities, the residuals corresponding to the different "determinations".

Thanks to this over-determination or redundancy, the reconstructed velocity and residual elevation values on all selected PS are more robust to errors and less noisy.

Then, in order to retrieve the displacement evolution of each identified PS it is necessary to unwrap the phases of all the interferograms. The reconstructed velocities and elevations are removed according to the equation (1) from each interferometric phase; the residuals are ideally independent on the spatial and temporal baselines.

The residual phases on the sparse set of selected points can be unwrapped as taught in M. Costantini, *A novel phase unwrapping method based on network programming*, IEEE Trans. Geosci. Remote Sensing, vol. 36, pp. 813-821, May 1998, and in M. Costantini and P. Rosen, *A generalized phase unwrapping approach for sparse data*, in Proc. Int. Geosci. Remote Sensing Symp. (IGARSS), Hamburg, Germany, Jun. 28-Jul. 2, 1999, pp. 267-269.

Moreover, from the unwrapped residual phases, the atmospheric artifacts characterized by slow and fast variability in the space and time domains, respectively, are filtered out, to obtain the phases related to the non-linear-with-time component of displacements.

Finally, the PS displacement evolution is obtained by adding the constant velocity and the non-linear-with-time components of the displacements.

A further filtering can be in case applied based on the idea that displacement accelerations cannot be too high, as taught in M. Costantini, F. Minati, and L. Pietranera, *A Curvature Based Method for Combining Multi-Temporal SAR Differential Interferometric Measurements*, in Proc. of Fringe 2003 Workshop, Frascati, Italy, December 2003.

After depurating the phase from atmospheric artifacts, the process can in principle be iterated.

From the foregoing, it may be immediately appreciated that the method according to the present invention for identifying and analyzing Persistent Scatterers in series of full resolution SAR images, i.e., the PSP method, effectively overcomes the problems coming from orbital and atmosphere phase artifacts by exploiting their spatial correlation, without using model-based interpolations or fits.

In particular, the PSP method is particularly advantageous when the atmospheric artifacts or the displacements to be retrieved are not very well described by the models used in the standard PS approach.

Moreover, the PSP method does not need a preprocessing to calibrate the data, is less sensitive to the density of PS, and is able to better identify PS in natural terrains and PS characterized by non linear movements.

Furthermore, the PSP method is computationally efficient and highly parallelizable.

Finally, it is clear that numerous modifications and variants can be made to the present invention, all falling within the scope of the invention, as defined in the appended claims.

The invention claimed is:

1. A method for identifying persistent scatterers in digital Synthetic Aperture Radar (SAR) images of an area of Earth's surface each taken at a respective time, the method comprising:

processing, via a processing device, the digital Synthetic Aperture Radar (SAR) images to produce digital generalized differential interferograms; and analyzing, via the processing device, properties of pairs of pixels in the digital generalized differential interferograms to identify individual pixels imaging persistent scatterers, wherein analyzing, via the processing device, properties of pairs of pixels in the digital generalized differential interferograms includes (i) determining, via the processing device, temporal-coherence-related values ($\gamma_a$) for the pairs of pixels, and (ii) identifying, via the processing device, said individual pixels based on the determined temporal-coherence-related values ($\gamma_a$).

2. The method of claim 1, wherein analyzing, via the processing device, properties of pairs of pixels in the digital generalized differential interferograms comprises analyzing properties of the same pairs of pixels in the digital generalized differential interferograms.

3. The method according to claim 1, wherein processing, via the processing device, the digital Synthetic Aperture Radar (SAR) images to produce digital generalized differential interferograms includes:
co-registering the digital Synthetic Aperture Radar (SAR) images;
selecting, among the co-registered digital Synthetic Aperture Radar (SAR) images, a reference image; and
processing the co-registered digital Synthetic Aperture Radar (SAR) images to produce said digital generalized differential interferograms which comprise an identically-zero-phase digital differential interferogram produced based only on the processed reference image, and digital differential interferograms each produced based on the processed reference image and on a respective processed co-registered digital Synthetic Aperture Radar (SAR) image.

4. The method according to claim 1, wherein processing, via the processing device, the digital Synthetic Aperture Radar (SAR) images to produce digital generalized differential interferograms includes:
co-registering the digital Synthetic Aperture Radar (SAR) images; and
processing the co-registered digital Synthetic Aperture Radar (SAR) images to produce said digital generalized differential interferograms each produced based on a respective processed co-registered digital Synthetic Aperture Radar (SAR) image and on a synthetic reference image.

5. The method of claim 1, wherein identifying, via the processing device, said individual pixels comprises:
detecting that a considered pixel images a persistent scatterer if a temporal-coherence-related value ($\gamma_a$) determined for a pair of pixels comprising said considered pixel meets a first detection criterion.

6. The method of claim 5, wherein detecting that a considered pixel images a persistent scatterer comprises:
detecting that said considered pixel images a persistent scatterer if said temporal-coherence-related value ($\gamma_a$) determined for said pair of pixels comprising said considered pixel is higher than a first detection threshold.

7. The method of claim 1, wherein identifying, via the processing device, said individual pixels comprises:
detecting that a considered pixel images a persistent scatterer if temporal-coherence-related values ($\gamma_a$) determined for pairs of pixels comprising said considered pixel meets a second detection criterion.

8. The method of claim 7, wherein detecting that a considered pixel images a persistent scatterer comprises:
detecting that said considered pixel images a persistent scatterer if said temporal-coherence-related values ($\gamma_a$) determined for said pairs of pixels comprising said considered pixel comprise a number of temporal-coherence-related values ($\gamma_a$) higher than respective first detection thresholds which number is higher than a second detection threshold.

9. The method according to claim 1, further comprising:
selecting an initial set of pixels in the digital generalized differential interferograms according to a given selection criterion;
determining temporal-coherence-related values ($\gamma_a$) comprising:
determining the temporal-coherence-related values ($\gamma_a$) for pairs of pixels belonging to said initial set;
identifying said individual pixels further comprising:
identifying said individual pixels among the pixels belonging to said initial set based on the temporal-coherence-related values ($\gamma_a$) determined for said pairs of pixels belonging to said initial set; and
forming a set of identified pixels with the individual pixels identified among the pixels belonging to said initial set.

10. The method of claim 9, wherein determining temporal-coherence-related values ($\gamma_a$) further comprises:
determining the temporal-coherence-related values ($\gamma_a$) for given pairs of pixels, each given pair being made up of a respective first pixel belonging to said set of identified pixels and a respective second pixel not belonging to said set of identified pixels;
identifying said individual pixels further comprising:
identifying said individual pixels among the second pixels of said given pairs based on the temporal-coherence-related values ($\gamma_a$) determined for said given pairs; and
adding to said set of identified pixels the individual pixels identified among the second pixels of said given pairs.

11. The method according to claim 1, wherein a pixel in a digital generalized differential interferogram is indicative of an interferometric phase, and wherein determining, via the processing device, temporal-coherence-related values ($\gamma_a$) comprises:
determining a temporal-coherence-related value ($\gamma_a$) for a pair of considered pixels in the digital generalized differential interferograms on the basis of the interferometric phases of said considered pixels in the digital generalized differential interferograms.

12. The method of claim 11, wherein determining a temporal-coherence-related value ($\gamma_a$) for a pair of considered pixels comprises:
computing phase-related differential values ($\delta\phi_{a,i}$) indicative of differences between the interferometric phases of said considered pixels in the digital generalized differential interferograms; and
determining said temporal-coherence-related value ($\gamma_a$) based on the computed phase-related differential values ($\delta\phi_{a,i}$).

13. The method of claim 12, wherein determining said temporal-coherence-related value ($\gamma_a$) based on the computed phase-related differential values ($\delta\phi_{a,i}$) comprises:
determining said temporal-coherence-related value ($\gamma_a$) further based on an elevation-related differential value ($\delta h_a$) and on a velocity-related differential value ($\delta v_a$), said elevation-related differential value ($\delta h_a$) being indicative of a difference between respective elevations of two points on the Earth's surface, said two points being imaged by said considered pixels, said velocity-related differential value ($\delta_a$) being indicative of a difference between respective displacement velocities of said two points on the Earth's surface.

14. The method of claim 13, wherein said temporal-coherence-related value ($\gamma_a$) determined for said pair of said considered pixels is determined according to the following definition:

$$\gamma_a = \max_{\delta v_a, \delta h_a} \left| \sum_i w_{a,i} e^{j\varepsilon_{a,i}} \right|,$$

wherein a denote said pair of said considered pixels, $\gamma_a$ denotes said temporal-coherence-related value, $\delta v_a$ denotes said velocity-related differential value, $\delta h_a$ denotes said elevation-related differential value, i denotes an index identifying a respective i-th considered digital generalized differential interferogram among said digital generalized differential interferograms, $w_{a,i}$ denotes a given weight chosen according to a given weighting criterion, and $\epsilon_{a,i}$ denotes a quantity obtained by inverting the following equation:

$$\delta\phi_{a,i} = \left[\frac{4\pi}{\lambda}(T_i\delta v_a + \alpha B_i\delta h_a) + \varepsilon_{a,i}\right]_{2\pi},$$

wherein $\delta\phi_{a,i}$ denotes the phase-related differential value indicative of the difference between the interferometric phases of said considered pixels in the i-th considered digital generalized differential interferogram, $\lambda$ denotes a wavelength at which the digital Synthetic Aperture Radar (SAR) images have been taken, $T_i$ denotes a temporal baseline associated with the i-th considered digital generalized differential interferogram, $\alpha$ denotes a known parameter, and $B_i$ denotes a perpendicular spatial baseline associated with the i-th considered digital generalized differential interferogram.

15. The method of claim 14, wherein the given weight denoted by $w_{a,i}$ depends on amplitude values in the digital Synthetic Aperture Radar (SAR) images.

16. The method according to claim 13, further comprising:
determining elevation-related values on the basis of the elevation-related differential values ($\delta h_a$) based on which have been determined the temporal-coherence-related values ($\gamma_a$) for pairs of said identified individual pixels, each elevation-related value being associated with a respective identified individual pixel and being indicative of an elevation of a persistent scatterer on the Earth's surface which persistent scatterer is imaged by the respective identified individual pixel; and
determining constant-velocity-related values on the basis of the velocity-related differential values ($\delta v_a$) based on which have been determined the temporal-coherence-related values ($\gamma_a$) for the pairs of said identified individual pixels, each constant-velocity-related value being associated with a respective identified individual pixel and being indicative of a displacement constant velocity of a persistent scatterer on the Earth's surface which persistent scatterer is imaged by the respective identified individual pixel.

17. The method of claim 16, further comprising:
computing residual phases for said identified individual pixels based on the interferometric phases of said identified individual pixels, on the determined elevation-related values, and on the determined constant-velocity-related values;
unwrapping the computed residual phases;
filtering out atmospheric artifacts from the computed residual phases to obtain non-linear-with-time components of displacement of the persistent scatterers imaged by said identified individual pixel; and
determining displacements of the persistent scatterers imaged by said identified individual pixels based on the determined constant-velocity-related values and on the non-linear-with-time components of displacement.

18. A system for identifying persistent scatterers in digital Synthetic Aperture Radar (SAR) images of an area of Earth's surface each taken at a respective time, the system comprising:
a memory device for storing the digital Synthetic Aperture Radar (SAR) images; and
a processing device to (i) process the digital Synthetic Aperture Radar (SAR) images to produce digital generalized differential interferograms, and (ii) analyze properties of pairs of pixels in the digital generalized differential interferograms to identify individual pixels imaging persistent scatterers by determining, via the processing device, temporal-coherence-related values ($\gamma_a$) for the pairs of pixels and identifying, via the processing device, said individual pixels based on the determined temporal-coherence-related values ($\gamma_a$).

19. A non-transitory computer readable medium storing instructions, wherein execution of the instructions by a processing device causes the processing device to implement a method comprising:
processing, via the processing device, digital Synthetic Aperture Radar (SAR) images to produce digital generalized differential interferograms; and
analyzing, via the processing device, properties of pairs of pixels in the digital generalized differential interferograms to identify individual pixels imaging persistent scatterers,
wherein analyzing, via the processing device, properties of pairs of pixels in the digital generalized differential interferograms includes (i) determining, via the processing device, temporal-coherence-related values ($\gamma_a$) for the pairs of pixels, and (ii) identifying, via the processing device, said individual pixels based on the determined temporal-coherence-related values ($\gamma_a$).

* * * * *